(12) United States Patent
Coward et al.

US010542328B2

(10) Patent No.: US 10,542,328 B2
(45) Date of Patent: Jan. 21, 2020

(54) SYSTEMS AND METHODS FOR PROVIDING CONTENT

(71) Applicant: Facebook, Inc., Menlo Park, CA (US)

(72) Inventors: Michael Hamilton Coward, Solana Beach, CA (US); Amit Puntambekar, Fremont, CA (US); David Young Joon Pio, Santa Clara, CA (US); Evgeny V. Kuzyakov, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/395,951

(22) Filed: Dec. 30, 2016

(65) Prior Publication Data
US 2018/0190327 A1  Jul. 5, 2018

(51) Int. Cl.
*H04N 5/77* (2006.01)
*H04N 5/775* (2006.01)
*G11B 27/00* (2006.01)
*H04N 21/845* (2011.01)
*H04N 5/232* (2006.01)
*H04N 21/6587* (2011.01)
*H04N 21/218* (2011.01)
*H04N 21/472* (2011.01)
*H04N 21/81* (2011.01)
*H04N 5/76* (2006.01)
*H04N 5/917* (2006.01)

(52) U.S. Cl.
CPC ..... *H04N 21/8456* (2013.01); *H04N 5/23238* (2013.01); *H04N 21/21805* (2013.01); *H04N 21/47217* (2013.01); *H04N 21/6587* (2013.01); *H04N 21/816* (2013.01)

(58) Field of Classification Search
CPC ............ H04N 5/77; H04N 5/775; H04N 5/76; H04N 5/917; G11B 27/00
USPC ........ 386/223, 230, 278, 280, 282, 326, 341
See application file for complete search history.

(56) References Cited

U.S. PATENT DOCUMENTS

| | | | | |
|---|---|---|---|---|
| 8,867,886 B2* | 10/2014 | Feinson | ................... | H04N 5/77 386/201 |
| 9,858,706 B2* | 1/2018 | Pio | ......................... | G06T 15/20 |
| 2005/0213666 A1* | 9/2005 | Kaneko | ................ | G11B 27/105 375/240.26 |
| 2005/0254363 A1* | 11/2005 | Hamada | ............... | G11B 27/034 369/47.1 |
| 2008/0282287 A1* | 11/2008 | Chen | ................. | G06F 17/30843 725/37 |
| 2015/0237402 A1* | 8/2015 | Lee | .................. | H04N 21/47202 725/46 |
| 2017/0084073 A1* | 3/2017 | Pio | ......................... | G06T 15/20 |

* cited by examiner

*Primary Examiner* — Daquan Zhao
(74) *Attorney, Agent, or Firm* — Sheppard Mullin Richter & Hampton LLP

(57) ABSTRACT

Systems, methods, and non-transitory computer-readable media can present one or more base segments of a first stream of a content item in a viewport interface, the content item being composed using a set of streams that each capture at least one scene from a particular direction, wherein the viewport interface is provided through a display screen of the computing device. A determination is made that a direction of the viewport interface has changed to a different direction during playback of a first base segment of the first stream. One or more offset segments of a second stream that correspond to the different direction are presented in the viewport interface, the offset segments being offset from the set of base segments of the first stream.

20 Claims, 9 Drawing Sheets

Base Segments

Offset Segments

SYSTEMS AND METHODS FOR PROVIDING CONTENT

FIELD OF THE INVENTION

The present technology relates to the field of content provision. More particularly, the present technology relates to techniques for providing content through computing devices.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform. In some instances, the content items can be categorized and/or curated.

SUMMARY

Various embodiments of the present disclosure can include systems, methods, and non-transitory computer readable media configured to present one or more base segments of a first stream of a content item in a viewport interface, the content item being composed using a set of streams that each capture at least one scene from a particular direction, wherein the viewport interface is provided through a display screen of the computing device. A determination is made that a direction of the viewport interface has changed to a different direction during playback of a first base segment of the first stream. One or more offset segments of a second stream that correspond to the different direction are presented in the viewport interface, the offset segments being offset from the set of base segments of the first stream.

In some embodiments, the base segments of the first stream each correspond to a pre-determined fixed-length duration of the first stream.

In some embodiments, the offset segments of the second stream each correspond to a pre-determined fixed-length duration of the second stream, each offset segment being offset from the respective playback positions of the base segments of the first stream by a pre-determined amount.

In some embodiments, the offset segments of the second stream are generated based at least in part on a publisher of the content item.

In some embodiments, the offset segments of the second stream are generated based at least in part on a popularity of the content item as measured by a social networking system.

In some embodiments, the offset segments of the second stream are generated based at least in part on a probability transition map that predicts a direction of the viewport interface while accessing the content item for any given playback position.

In some embodiments, the offset segments of the second stream are generated based at least in part on the subject matter captured in the scene.

In some embodiments, the lengths of the offset segments are determined based on the subject matter captured in the scene.

In some embodiments, the set of streams collectively capture a 360-degree view of the scene.

In some embodiments, the second stream being presented through the viewport interface is selected based at least in part on a direction of the viewport interface relative to the scene.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
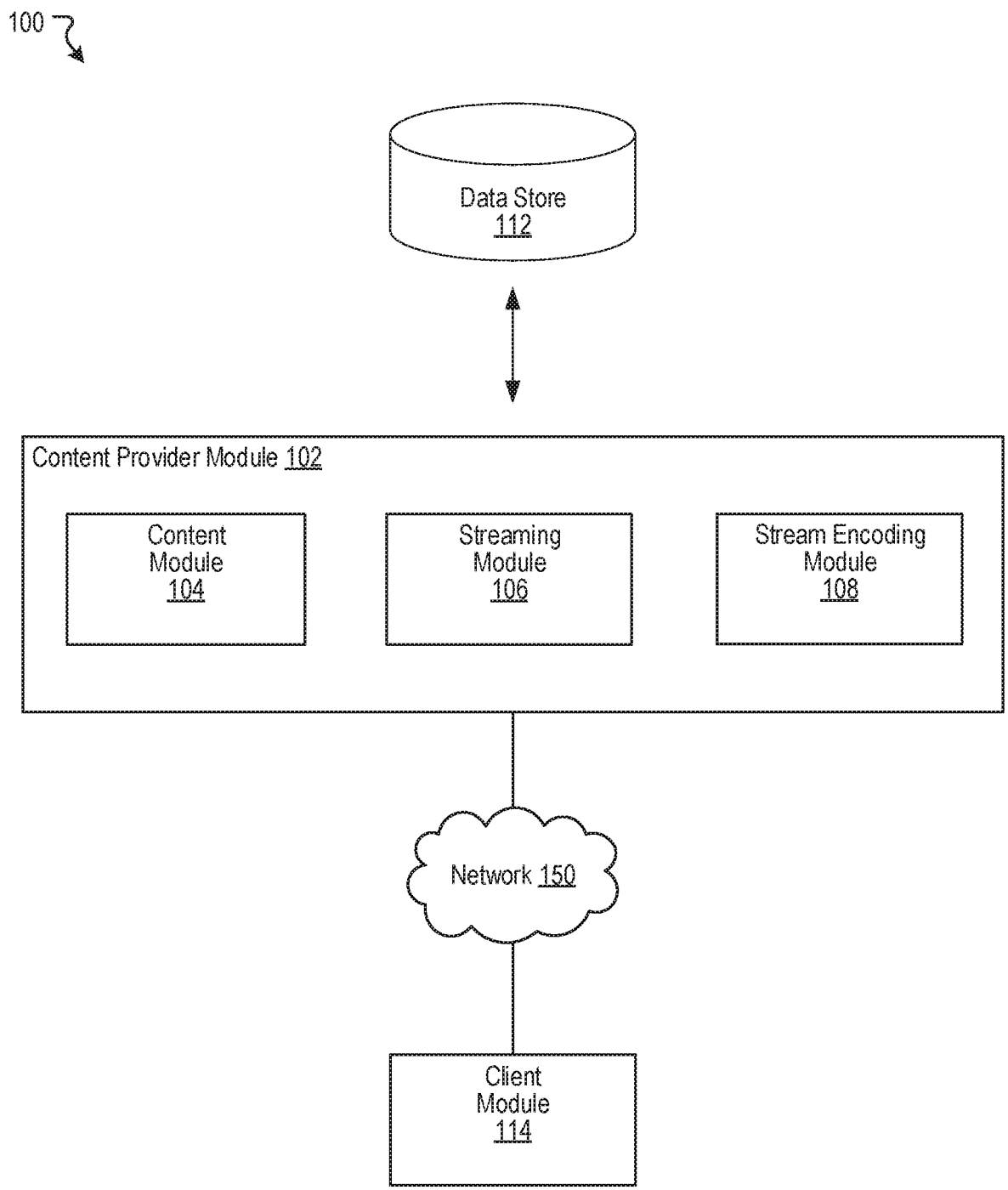
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Content

People use computing devices (or systems) for a wide variety of purposes. As mentioned, under conventional approaches, a user can utilize a computing device to share content items (e.g., documents, images, videos, audio, etc.) with other users. Such content items can be made available through a content sharing platform. Users can operate their computing devices to access the content items through the platform. Typically, the content items can be provided, or uploaded, by various entities including, for example, content publishers and also users of the content sharing platform.

In some instances, a user can access virtual reality content through a content provider. Such virtual reality content can be presented, for example, in a viewport that is accessible through a computing device (e.g., a virtual reality device, headset, or any computing device capable of presenting virtual reality content). In some embodiments, the virtual reality content may be a spherical video that captures a 360 degree view of a scene, for example. The spherical video can be created by stitching together various video streams (or feeds) that were captured by cameras that are placed at particular locations and/or positions to capture a 360 degree view of the scene. Once stitched together, a user can access, or playback, the spherical video. Generally, while accessing the spherical video, the user can zoom and change the direction (e.g., pitch, yaw, roll) of the viewport to access different portions of the scene in the spherical video. The direction of the viewport can be used to determine which stream of the spherical video is presented.

For example, there may be a total of 10 streams that are stitched to create a spherical video. Each stream can correspond to some viewable direction in the spherical video (e.g., front, back, left, right, top, bottom, etc.). In some embodiments, each stream is divided into segments (e.g., dash segments) that each correspond to some fixed-length duration of the stream (e.g., 1-second segments, 2-second segments, etc.). For example, a stream may be divided into a set of segments that each correspond to 5 seconds of the stream. When presented sequentially, this set of segments can be used to playback the stream in its entirety. Another stream corresponding to a particular viewable direction in the spherical video can also be partitioned into a set of segments that each correspond to 5 seconds of the stream. Generally, the stream being presented in the viewport can change during playback of the spherical video to correspond to the direction of the viewport. For example, content corresponding to a first direction in the spherical video may be provided by a first stream while content corresponding to a second direction in the spherical video may be provided by a second stream. In some instances, there may be a noticeable lag when switching between the presentation of one stream to another stream. In one example, a lag may result when the viewport direction changes while a segment of a first stream is being presented. In this example, to ensure that segments are presented sequentially, the segment of the first stream typically must be presented for the remainder of its segment duration until a segment of a stream corresponding to the new viewport direction can be presented. In other words, a segment corresponding to a 5-second duration will typically be presented for the entirety of its 5-second duration despite any changes to the viewport direction before that 5-second duration has elapsed. In the meantime, the content corresponding to the new direction of the viewport will typically still be rendered albeit at a lower resolution. Once playback of the segment of the first stream has completed, the viewport can present the segment of the second stream which provides content corresponding to the new direction of the viewport at a higher resolution. Such latency issues that arise when switching between streams can degrade the overall user experience. Accordingly, such conventional approaches may not be effective in addressing these and other problems arising in computer technology.

An improved approach overcomes the foregoing and other disadvantages associated with conventional approaches. In various embodiments, streams of a spherical video can be segmented at different offsets. For example, the streams can be partitioned into a set of base segments that each correspond to some fixed-length duration of the stream. In this example, each stream can be divided into a set base of segments and each base segment can correspond to 10 seconds of the stream. In some embodiments, some, or all, of these streams can also be partitioned into a set of offset segments and each offset segment can correspond to some fixed-length duration of the stream that is offset from the base segments. Thus, in this example, each stream can be divided into a set of offset segments and each offset segment can correspond to 10 seconds of the stream. In this example, the set of offset segments can be offset from the set of base segments by some amount. For example, the set of base segments of a stream can include a first base segment that corresponds to seconds 0-10 (0:00-0:10) of the spherical video, a second base segment that corresponds to seconds 10-20 (0:10-0:20), and a third base segment that corresponds to seconds 20-30 (0:20-0:30). In some embodiments, the set of offset segments of each stream can be offset by half of the playback positions of the base segments. In this example, the set of offset segments of the stream can include a first offset segment that corresponds to seconds 5-15 (0:05-0:15) of the spherical video, a second offset segment that corresponds to seconds 15-25 (0:15-0:25), and a third offset segment that corresponds to seconds 25-30 (0:25-0:30). Having such multiple versions of streams at different offsets helps alleviate latency issues that can arise when switching between different streams of a spherical video. The examples herein reference spherical videos for ease of discussion. However, the approaches described herein can be adapted for any type of immersive video including, for example, half sphere videos (e.g., 180 degree videos), arbitrary partial spheres, 225 degree videos, 3D 360 videos, to name some examples. In various embodiments, the approaches described herein can be adapted for any media that encompasses (or surrounds) a viewer (or user). Moreover, such immersive videos need not be limited to videos that are formatted using a spherical shape but may also be applied to immersive videos formatted using other shapes including, for example, cubes, pyramids, and other shape representations of a video recorded three-dimensional world.

FIG. 1 illustrates an example system 100 including an example content provider module 102, according to an embodiment of the present disclosure. As shown in the example of FIG. 1, the content provider module 102 can include a content module 104, a streaming module 106, and a stream encoding module 108. In some instances, the example system 100 can include at least one data store 112. A client module 114 can interact with the content provider module 102 over one or more networks 150 (e.g., the Internet, a local area network, etc.). The client module 114 can be implemented in a software application running on a computing device (e.g., a virtual reality device, headset, or any computing device capable of presenting virtual reality content). In various embodiments, the network 150 can be any wired or wireless computer network through which devices can exchange data. For example, the network 150 can be a personal area network, a local area network, or a wide area network, to name some examples. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user computing device or client computing system. For example, the content provider module 102, or at least a portion thereof, can be implemented as or within an application (e.g., app), a program, or an applet, etc., running on a user computing device or a client computing system, such as the user device 610 of FIG. 6. Further, the content provider module 102, or at least a portion thereof, can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. It should be understood that there can be many variations or other possibilities.

In some embodiments, the content provider module 102 can be configured to communicate and/or operate with the at least one data store 112 in the example system 100. The at least one data store 112 can be configured to store and maintain various types of data. In various embodiments, the at least one data store 112 can store data relevant to function and operation of the content provider module 102. One example of such data can be virtual reality content items that are available for access (e.g., streaming). In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data. It should be appreciated that there can be many variations or other possibilities.

In various embodiments, the content module 104 can provide access to various types of virtual reality content items to be presented through a viewport. This viewport may be provided through a display of a computing device (e.g., a virtual reality computing device) in which the client module 114 is implemented, for example. In some instances, the computing device may be running a software application (e.g., social networking application) that is configured to present virtual reality content items. Some other examples of virtual reality content can include videos composed using monoscopic 360 degree views or videos composed using stereoscopic 180 degree views, to name some examples. In various embodiments, these virtual reality content items can include spherical videos. A spherical video can capture 360 degree views of one or more scenes over some duration of time. Such scenes may be captured from the real world and/or be computer generated. Further, the spherical video can be created by stitching together various video streams (or feeds) that were captured by cameras that are placed at particular locations and/or positions to capture a 360 degree view of the scene. Such streams may be pre-determined for various directions, e.g., angles (e.g., 0 degree, 30 degrees, 60 degrees, etc.), accessible in a spherical video. Once stitched together, a user can access, or playback, the spherical video to view a portion of the spherical video along some direction (or angle). Generally, the portion of the spherical video (e.g., stream) shown to the user can be determined based on the location and direction of the user's viewport in three-dimensional space. In some embodiments, a content item (e.g., stream, immersive video, spherical video, etc.) may be composed using multiple content items. For example, a content item may be composed using a first content item (e.g., a first live broadcast) and a second content item (e.g., a second live broadcast).

For example, the computing device in which the client module 114 is implemented can request playback of a spherical video. In this example, the streaming module 106 can provide one or more streams of the spherical video to be presented through the computing device. The stream(s) provided will typically correspond to a direction of the viewport in the spherical video being accessed. As playback of the spherical video progresses, the client module 114 can continually provide the content provider module 102 with information updating the direction at which the viewport is facing. The streaming module 106 can use this information to determine which stream to provide the client module 114. For example, while accessing the spherical video, the client module 114 can notify the content provider module 102 that the viewport is facing a first direction. Based on this information, the streaming module 106 can provide the client module 114 with a first stream of the spherical video that corresponds to the first direction. In some embodiments, upon accessing a spherical video, data corresponding to low resolution versions of streams corresponding to all of the viewable directions in the spherical video are provided to the client module 114. This data can be stored (or cached) for use during playback of the spherical video. In such embodiments, the client module 114 can notify the content provider module 102 when the viewport is facing a given direction. Based on this information, the streaming module 106 can provide the client module 114 with a higher resolution version of the stream corresponding to the given direction.

In some embodiments, the stream encoding module 108 can partition one or more streams of the spherical video into respective sets of segments. In various embodiments, the stream encoding module 108 is configured to generate additional sets of segments for some, or all, of these streams at various different offsets. More details describing the stream encoding module 108 will be provided below in reference to FIG. 2.

Figure 2:
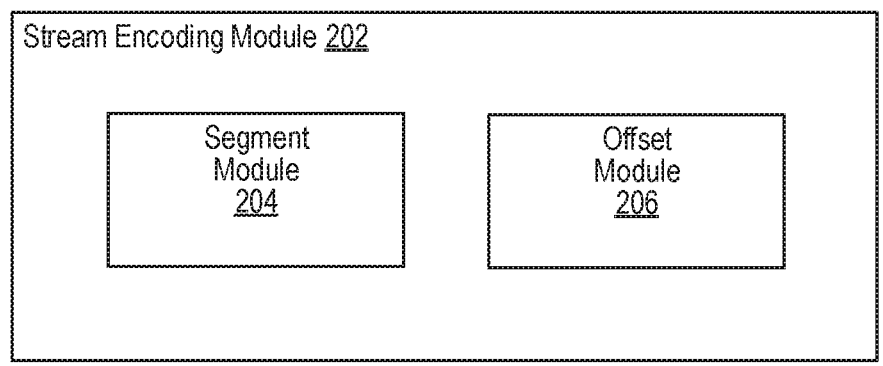
FIG. 2 illustrates an example of a stream encoding module, according to an embodiment of the present disclosure.

FIG. 2 illustrates an example of a stream encoding module 202, according to an embodiment of the present disclosure. In some embodiments, the stream encoding module 108 of FIG. 1 can be implemented with the stream encoding module 202. As shown in the example of FIG. 2, the stream encoding module 202 can include a segment module 204 and an offset module 206.

As mentioned, a spherical video can be composed of some number of streams. Each stream can correspond to some viewable direction in the spherical video (e.g., front, back, left, right, top, bottom, etc.). Thus, a Stream A of the spherical video may be presented in a user's viewport when the viewport is facing a first direction while a Stream B of the spherical video may be presented in the viewport when the viewport is facing a second direction. Naturally, the number of streams corresponding to a spherical video can vary depending on the number of cameras used to create the spherical video, for example.

In various embodiments, the segment module 204 can partition (or divide) one or more streams of the spherical video into segments. In some embodiments, when dividing a stream, the segment module 204 can partition the stream into a set of base segments and each base segment can correspond to some fixed-length duration of the stream. For example, a stream having a playback duration of 10 seconds can be segmented into 10 base segments that each correspond to 1 second of the stream. In this example, each base segment can include a set of video frames that correspond to its respective 1 second duration of the stream. In some embodiments, these base segments can be used when presenting the spherical video by default.

In various embodiments, the offset module 206 can generate one or more sets of offset segments for some, or all, of the streams of the spherical video at various offsets. For example, in some embodiments, the offset module 206 can generate a set of offset segments for a stream that are offset from the respective playback positions of the base segments of the stream by some amount. This playback offset value can vary and may be specified (or pre-determined). In some embodiments, the offset module 206 can tune, or adjust, the lengths of segments. For example, rather than generating 5 fixed-length segments that each correspond to 10 seconds of a 50 second stream, the offset module 206 can generate 10 fixed-length segments that each correspond to 5 seconds of the 50 second stream. In some embodiments, rather than being fixed in length, segments generated by the offset module 206 for a given stream can vary in length. For example, a first segment may have a length of 10 seconds while a second segment may have a length of 5 seconds.

In various embodiments, segment offsets and/or lengths for a given spherical video can be modified based on various criteria. For example, in some embodiments, segment offsets and/or lengths can vary depending on the publisher of the spherical video. In some embodiments, segment offsets and/or lengths can vary depending on the popularity of the spherical video in a social networking system, for example, as measured by some social engagement signal. In some embodiments, segment offsets and/or lengths can vary depending on the subject matter captured in one or more scenes of the spherical video.

In some embodiments, segment offsets and/or lengths can be determined based on a probability transition map (e.g., a Markov model) that provides a likelihood of transitioning from a first viewport direction to a second viewport direction while accessing a spherical video at a given playback time. The probability transition map can be generated by monitoring and measuring changes made by users to the viewport direction while viewing the spherical video. For example, a probability transition map may include transition information for several viewport directions at every second of playback time for the spherical video. In one example, the probability transition map can indicate that users watching the spherical video along a first viewport direction at second 0 of the playback were 90 percent likely to remain viewing along the first viewport direction at second 5 of the playback. The probability transition map can also indicate that users watching the spherical video along a second viewport direction of the playback were 85 percent likely to transition to the first viewport direction at second 5 of the playback. Such information helps predict the viewing direction of users for the spherical video at any given playback time. In various embodiments, such information can be utilized to reduce latency by generating offset segments for the spherical video at appropriate playback times. As mentioned, a probability transition map can be generated for a given spherical video by analyzing user viewing patterns in the aggregate. In some embodiments, however, multiple probability transition maps can be generated for a given spherical video with each probability transition map corresponding to a particular group of users that, for example, exhibit similar viewing patterns or exhibit any other similar characteristic (e.g., demographics including geographic location, age, actions or interests expressed on a social-networking system, etc.). In some embodiments, a clustering algorithm may be applied to segregate such users into separate groups based on correlating which viewport directions the users watched at a given playback time. A separate probability transition map may be determined and utilized for such groups of users. As a result, different sets of offset segments may be generated for any given spherical video. More details describing segments will be provided below in reference to FIGS. 3A-E.

Figure 3A:
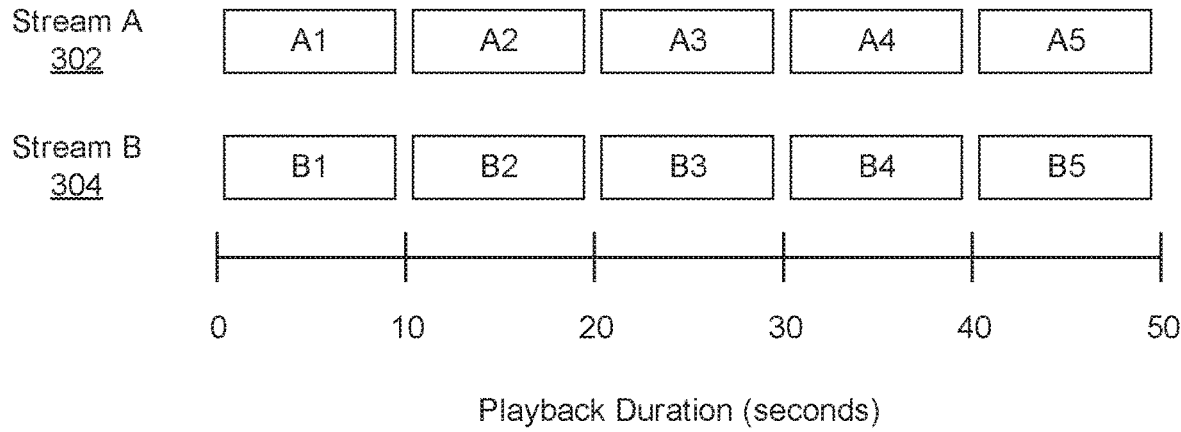
FIGS. 3A-E illustrate examples of a segmented stream, according to an embodiment of the present disclosure.

FIG. 3A illustrates examples of segmented streams. In FIG. 3A, a spherical video having a 50 second playback duration is composed using at least a Stream A that corresponds to a first direction in the spherical video and a Stream B that corresponds to a second direction in the spherical video. In this example, each of these streams have been partitioned into 5 base segments that each correspond to 10 seconds of the stream. As shown, Stream A 302 includes a base segment A1 that corresponds to seconds 0-10 (0:00-0:10) of the spherical video, a base segment A2 that corresponds to seconds 10-20 (0:10-0:20), a base segment A3 that corresponds to seconds 20-30 (0:20-0:30), a base segment A4 that corresponds to seconds 30-40 (0:30-0:40), and a base segment A5 that corresponds to seconds 40-50 (0:40-0:50). Similarly, Stream B 304 also includes a base segment B1 that corresponds to seconds 0-10 (0:00-0:10) of the spherical video, a base segment B2 that corresponds to seconds 10-20 (0:10-0:20), a base segment B3 that corresponds to seconds 20-30 (0:20-0:30), a base segment B4 that corresponds to seconds 30-40 (0:30-0:40), and a base segment B5 that corresponds to seconds 40-50 (0:40-0:50).

Figure 3B:
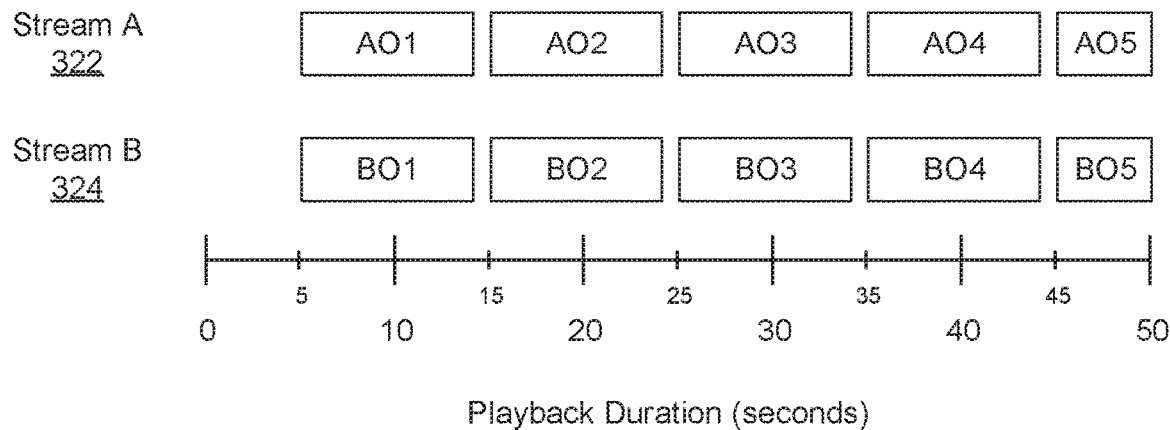

In some embodiments, additional sets of segments for some, or all, of the streams (e.g., Stream A, Stream B, etc.) of the spherical video can be generated at various playback offsets. For example, in addition to the base segments 302 that were generated for Stream A, a set of offset segments for Stream A can also be generated based on a specified (or pre-determined) playback offset. Similarly, in addition to the base segments 304 that were generated for Stream B, a set of offset segments for Stream B can also be generated based on the specified (or pre-determined) playback offset. In the example of FIG. 3B, a set of offset segments 322 for Stream A include a first offset segment AO1 that corresponds to seconds 5-15 (0:05-0:15) of the spherical video, a second offset segment AO2 that corresponds to seconds 15-25 (0:15-0:25), a third offset segment AO3 that corresponds to seconds 25-35 (0:25-0:35), a fourth offset segment AO4 that corresponds to seconds 35-45 (0:35-0:45), and a fifth offset segment AO5 that corresponds to seconds 45-50 (0:45-0:50). Similarly, a set of offset segments 324 for Stream B include a first offset segment BO1 that corresponds to seconds 5-15 (0:05-0:15) of the spherical video, a second offset segment BO2 that corresponds to seconds 15-25 (0:15-0:25), a third offset segment BO3 that corresponds to seconds 25-35 (0:25-0:35), a fourth offset segment BO4 that corresponds to seconds 35-45 (0:35-0:45), and a fifth offset segment BO5 that corresponds to seconds 45-50 (0:45-0:50).

Figure 3C:
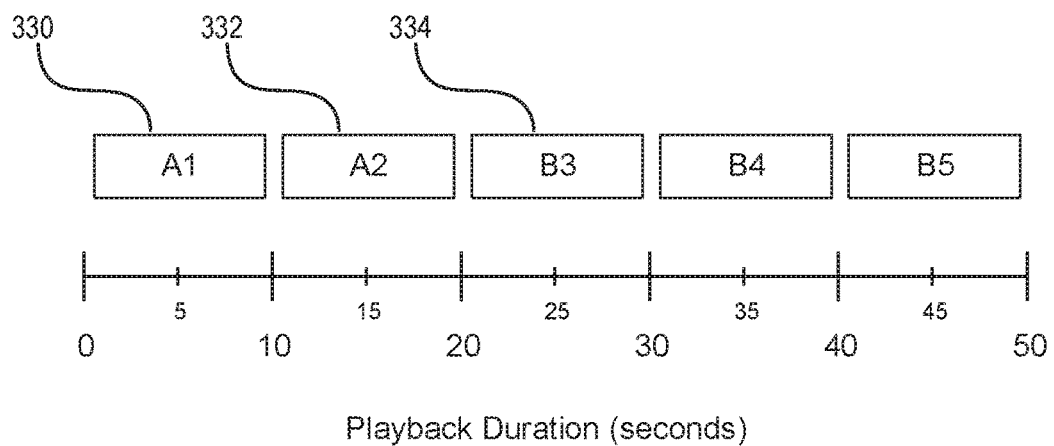

FIG. 3C illustrates an example playback sequence of the spherical video. In the example of FIG. 3C, a user operating a computing device (e.g., a virtual reality device, headset, or any computing device capable of presenting virtual reality content) can access the spherical video, for example, through a content provider system. In this example, when the user's viewport is facing a first direction during the initial playback of the spherical video, the base segment 330 (A1) of Stream A corresponding to the first direction can be obtained and presented. While presenting the base segment 330 (A1), the content corresponding to some, or all, of the other directions viewable in the spherical video can still be rendered albeit at a lower resolution than the content corresponding to the stream being presented (e.g., Stream A). Once playback of this base segment 330 (A1) is complete (e.g., 10 seconds have elapsed), the base segment 332 (A2) of Stream A can then be presented in the user's viewport. Here, this base segment 332 (A2) corresponds to the next 10 seconds of the spherical video, e.g., seconds 10-20 (0:10-0:20). Again, the content corresponding to some, or all, of the other directions viewable in the spherical video can still be rendered at a lower resolution during playback of the base segment 332 (A2).

In this example, when the direction of the user's viewport changes to a second direction, a base segment 334 (B3) of Stream B that corresponds to the second direction can be presented in the viewport. In some embodiments, this base segment 334 (B3) of Stream B is selected so that the previously presented segment (the base segment 332 of Stream A) and the base segment 334 of Stream B are sequentially aligned. Thus, if the user's viewport faces the second direction during playback of the base segment 332 (0:10-0:20) of Stream A, then the base segment 334 (0:20-0:30) of Stream B will be obtained and presented beginning at second 20 of the playback. Here, the base segment 330 of Stream A, the base segment 332 of Stream A, and the base segment 334 of Stream B are sequentially aligned since the base segment 330 provides playback of seconds 0-10 of the spherical video, the base segment 332 provides playback of seconds 10-20, and the base segment 334 provides playback of seconds 20-30 of the spherical video.

Figure 3D:
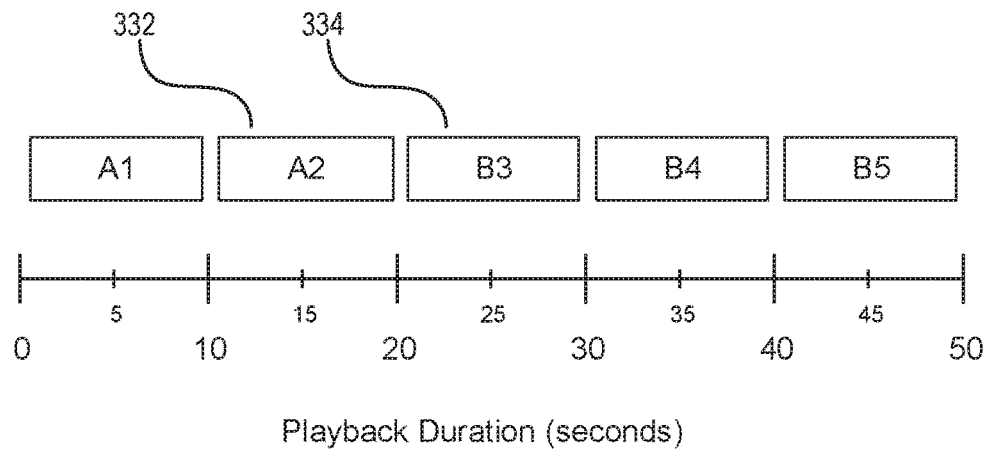
Figure 3E:
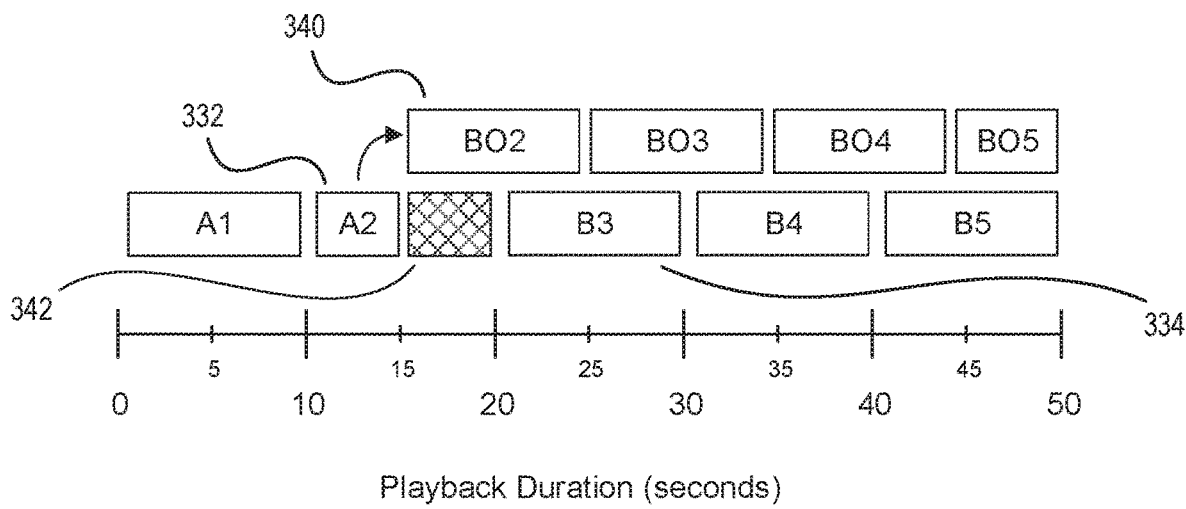

In some instances, there may be a noticeable delay until a segment from a different stream can be obtained and presented. For example, as illustrated in FIG. 3D, if the user's viewport direction faces the second direction at second 14 (0:14) during playback of the base segment 332 of Stream A, the viewport will continue to present the remainder of the base segment 332 (e.g., seconds 16-20) until the segment 334 of Stream B can be presented. Thus, in this example, the viewport will present content corresponding to the second direction at a low resolution (e.g., during seconds 15-20) until the segment 334 corresponding to the second direction can be presented beginning at second 20 of the playback.

To help reduce such rendering delays, in various embodiments, additional sets of offset segments for some, or all, of the streams (e.g., Stream A, Stream B, etc.) of the spherical video can be utilized. These offset segments of the spherical video can allow a user's viewport to switch between different streams of the spherical video more quickly than having to rely solely on the respective base segments that correspond to the streams (e.g., Stream A, Stream B, etc.) of the spherical video. For example, in FIG. 3E, the user's viewport direction changes to the second direction at second 14 (0:14) during playback of the base segment 332 of Stream A. Here, rather than waiting for the playback of the base segment 332 to complete (e.g., at second 20) before the segment 334 of Stream B can be presented, the content provider system can provide an appropriate offset segment from Stream B that continues the sequential playback of the spherical video. Thus, in FIG. 3E, when the user's viewport direction changes to the second direction at second 14 (0:14), the user's viewport can be provided an offset segment 340 (BO2) of Stream B which runs from seconds 15-25. Providing this offset segment 340 sooner (e.g., at second 15) allows the user's viewport to present content corresponding to the second direction in the spherical video at a higher resolution sooner. In contrast, if the offset segment 340 did not exist, the user's viewport would continue to present the segment 332 for the remainder of its playback duration (i.e., until second 20) before the segment 334 of Stream B can be presented. As a result, the content corresponding to the second direction between seconds 15-20 of the playback 342 would be shown at a lower resolution for a longer period of time, thereby degrading the overall user experience. In this example, once playback of the offset segment 340 has completed, the user's viewport can continue presenting the remaining offset segments (e.g., BO3, BO4, BO5) as long as the viewport direction does not change. If the viewport direction changes to a direction corresponding to Stream A, then the viewport can similarly be provided one or more base segments and/or offset segments of Stream A that preserve the sequential playback of the spherical video.

Figure 4A:
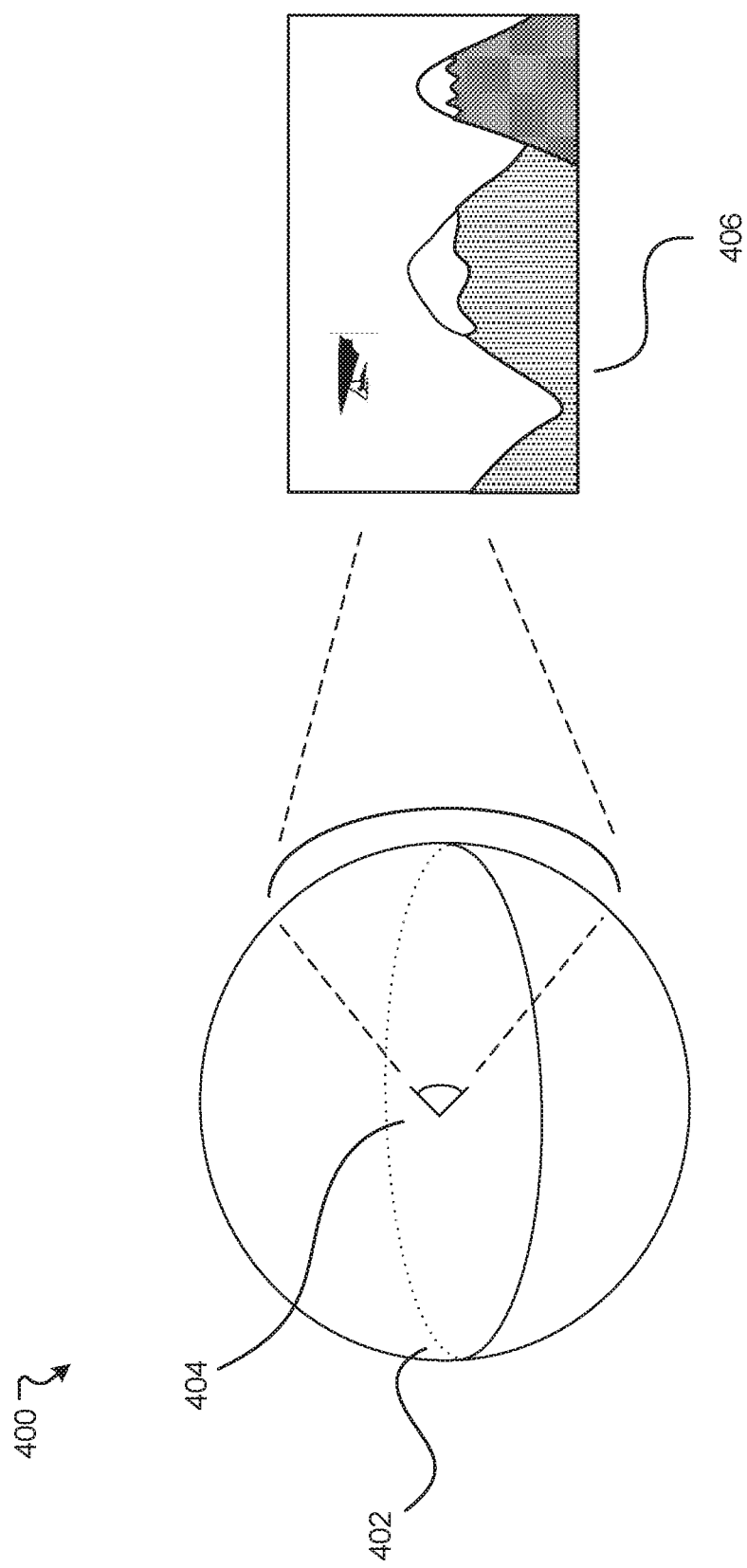
FIGS. 4A-B illustrate examples of streaming a spherical video, according to an embodiment of the present disclosure.
Figure 4B:
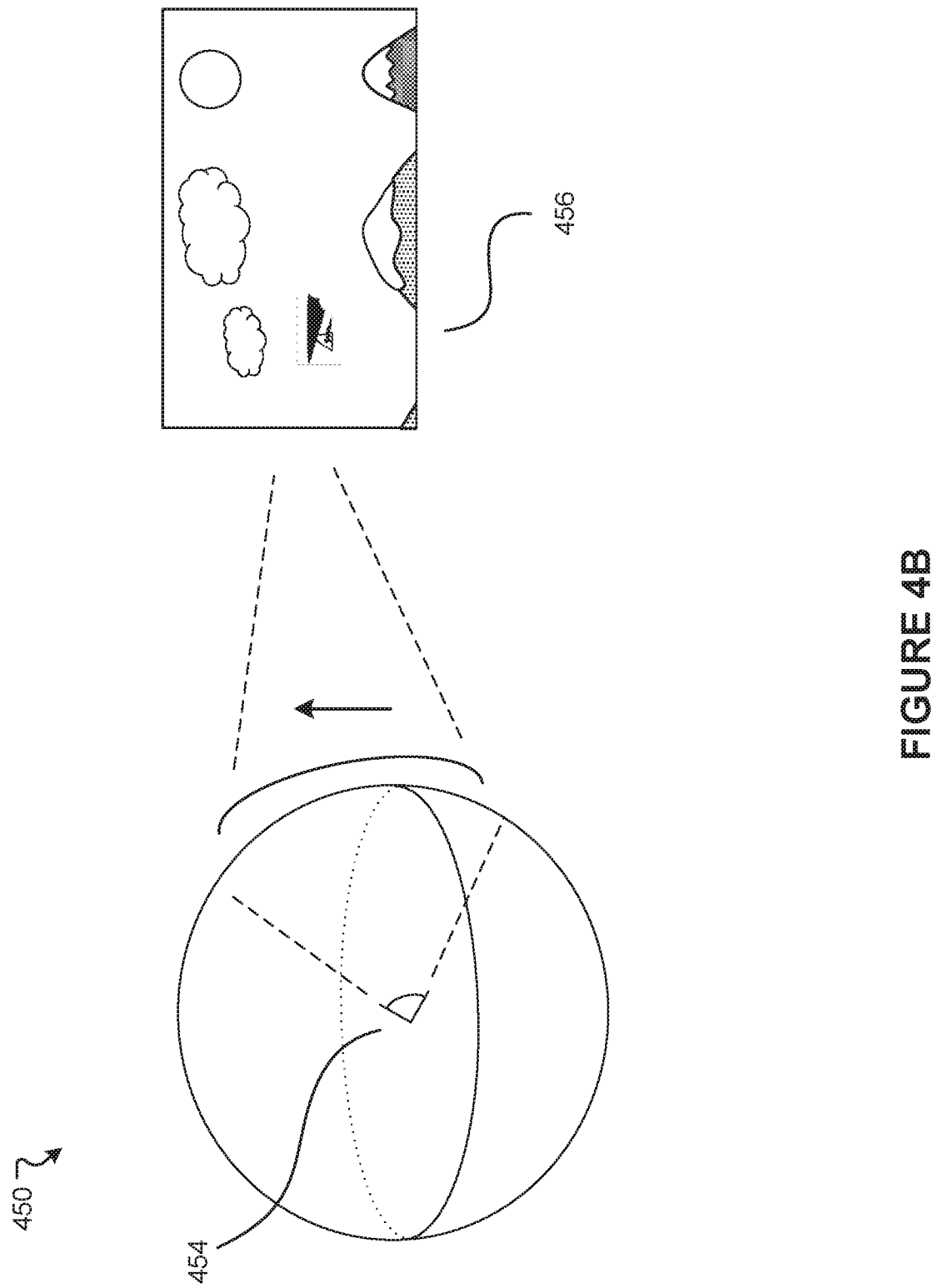

FIG. 4A-B illustrate examples of streaming a spherical video, according to an embodiment of the present disclosure. FIG. 4A illustrates an example 400 of a viewport 404 displaying a portion of a video stream 406 of a spherical video. The viewport 404 is shown in the diagram of FIG. 4A as being positioned within a representation 402 of a spherical video to facilitate understanding of the various embodiments described herein. In some embodiments, a spherical video captures a 360-degree view of a scene (e.g., a three-dimensional scene). The spherical video can be created by stitching together various video streams, or feeds, that were captured by cameras positioned at particular locations and/or positions to capture a 360 degree view of the scene.

Once stitched together, a user can access, or playback, the spherical video through a viewport 404 to view a portion of the spherical video at some angle. The viewport 404 may be accessed through a software application (e.g., video player software) running on a computing device. The stitched spherical video can be projected as a sphere, as illustrated by the representation 402. Generally, while accessing the spherical video, the user can change the direction (e.g., pitch, yaw, roll) of the viewport 404 to access another portion of the scene captured by the spherical video. FIG. 4B illustrates an example 450 in which the direction of the viewport 454 has changed in an upward direction (as compared to viewport 404) and, as a result, the video stream 456 of the spherical video being accessed through the viewport 454 has been updated (e.g., as compared to video stream 406) to show the portion of the spherical video that corresponds to the updated viewport direction.

The direction of the viewport 404 may be changed in various ways depending on the implementation. For example, while accessing the spherical video, the user may change the direction of the viewport 404 using a mouse or similar device or through a gesture recognized by the computing device. As the direction changes, the viewport 404 can be provided a stream corresponding to that direction, for example, from a content provider system. In another example, while accessing the spherical video through a display screen of a mobile device, the user may change the direction of the viewport 404 by changing the direction (e.g., pitch, yaw, roll) of the mobile device as determined, for example, using gyroscopes, accelerometers, touch sensors, and/or inertial measurement units in the mobile device. Further, if accessing the spherical video through a virtual reality head mounted display, the user may change the direction of the viewport 404 by changing the direction of the user's head (e.g., pitch, yaw, roll). Naturally, other approaches may be utilized for navigating playback of a spherical video including, for example, touch screen or other suitable gestures.

As mentioned, the spherical video for the scene can be created by stitching together camera feeds taken of the scene at various positions. When changing the direction of the viewport 404, the viewport 404 can be provided a stream of the spherical video that may be composed of one or more camera feeds taken of the scene. Such streams may be pre-determined for various angles (e.g., 0 degree, 30 degrees, 60 degrees, etc.) of the spherical video and the viewport may be provided the appropriate stream based on its direction (e.g., taking into account one or both of angle and position within the full 360-degree scene).

In some embodiments, the stream(s) are provided in real-time based on the determined direction of the viewport 404. For example, when the direction of the viewport 404 changes to a new position, the computing device through which the viewport 404 is being accessed and/or the content provider system can determine the new position of the viewport 404 and the content provider system can send, to the computing device, stream data corresponding to the new position. Thus, in such embodiments, each change in the viewport 404 position is monitored, in real-time (e.g., constantly or at specified time intervals) and information associated with the change is provided to the content provider system such that the content provider system may send the appropriate stream that corresponds to the change in direction.

Figure 5:
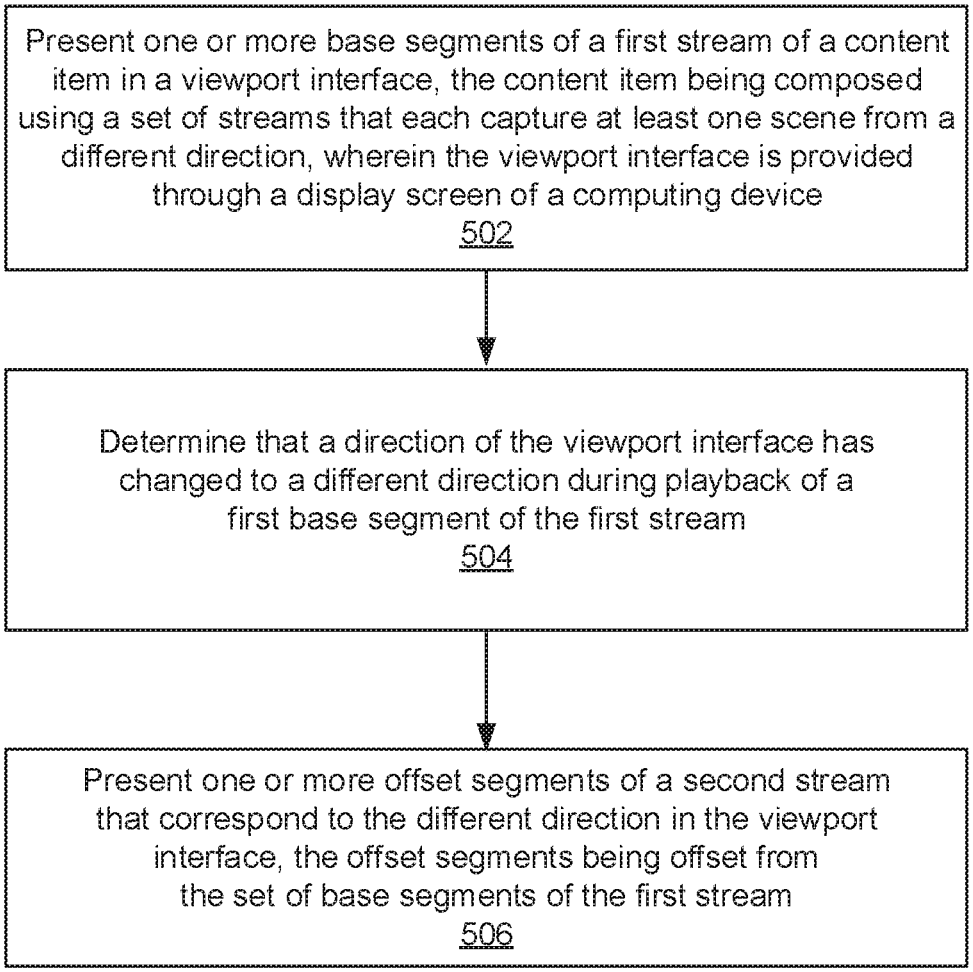
FIG. 5 illustrates an example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, one or more base segments of a first stream of a content item are presented in a viewport interface. The content item can be composed using a set of streams that each capture at least one scene from a particular direction. The viewport interface can be provided through a display screen of a computing device. At block 504, a determination is made that a direction of the viewport interface has changed to a different direction during playback of a first base segment of the first stream. At block 506, one or more offset segments of a second stream that correspond to the different direction are presented in the viewport interface, the offset segments being offset from the set of base segments of the first stream.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
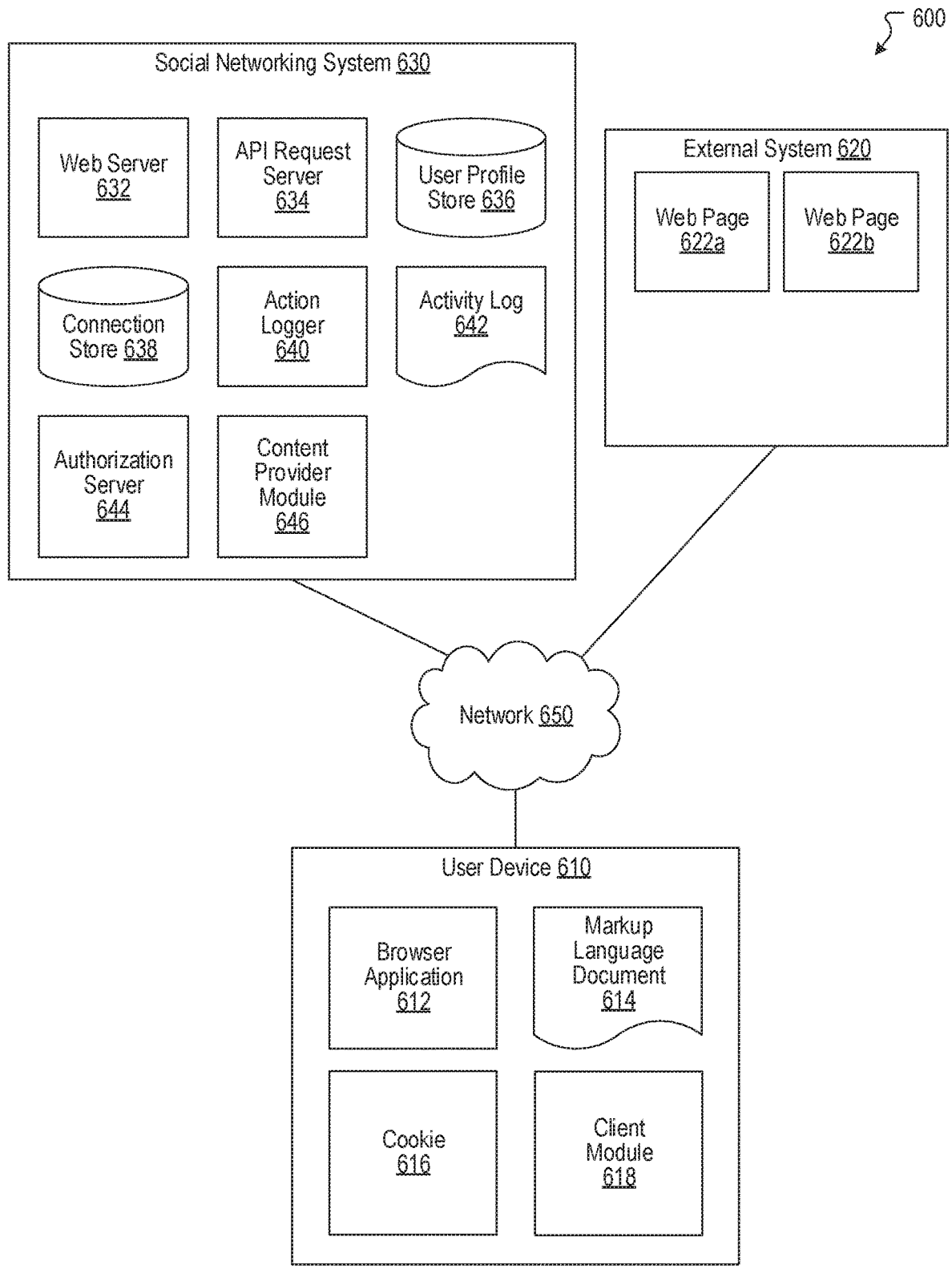
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the content provider module 646, or some of its features, can be implemented in a computing device, e.g., the user device 610. In some embodiments, the user device 610 can include a client module 618. The client module 618 can, for example, be implemented as the client module 114 of FIG. 1. As discussed previously, it should be appreciated that there can be many variations or other possibilities.

Hardware Implementation

Figure 7:
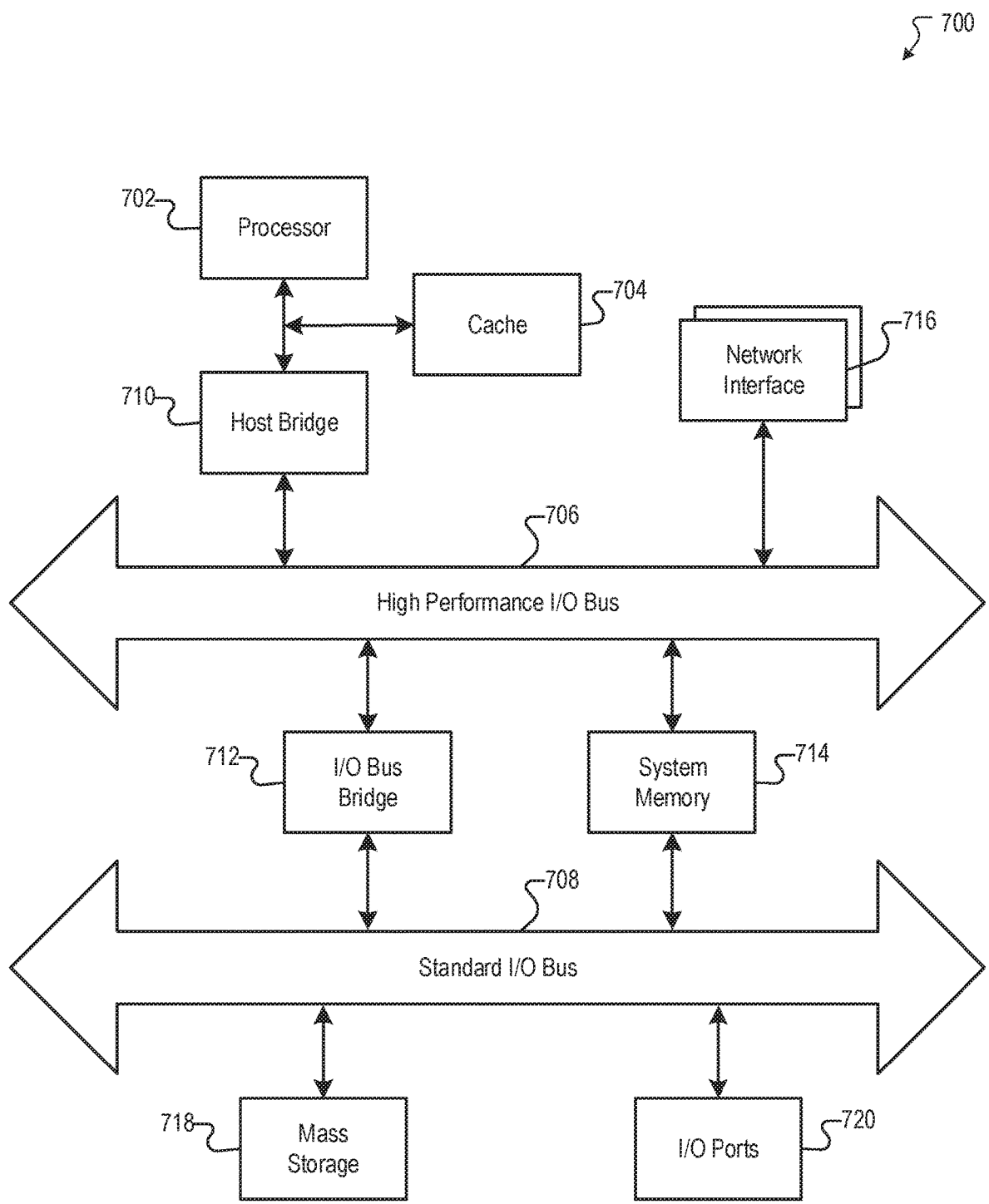
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716.

The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing device, a plurality of streams of an immersive video of a scene, wherein each stream corresponds to a viewable direction in the immersive video;
    partitioning, by the computing device, each stream into a set of base segments;
    presenting, by the computing device, a set of base segments of a first stream corresponding to a first direction in a viewport interface; and
    upon detecting a change from the first direction of the viewport interface to a second direction during playback of the first stream,
       stopping, by the computing device, presentation of the set of base segments of the first stream, and
       starting, by the computing device, presentation of offset segments of a second stream corresponding to the second direction in the viewport interface to reduce latency,
          wherein the offset segments are offset from base segments of the second stream;
          wherein the amount of offset of the second stream is determined based at least in part on a probability transition map predicting changes from the first direction in the viewport interface to the second direction during playback of the first stream.

2. The computer-implemented method of claim 1, wherein the base segments of the first stream each correspond to a pre-determined fixed-length duration of the first stream.

3. The computer-implemented method of claim 2, wherein the offset segments of the second stream each correspond to a pre-determined fixed-length duration of the second stream, each offset segment being offset from the respective playback positions of the base segments of the first stream by a pre-determined amount.

4. The computer-implemented method of claim 1, wherein the offset segments of the second stream are generated based at least in part on a publisher of the content item.

5. The computer-implemented method of claim 1, wherein the offset segments of the second stream are generated based at least in part on a popularity of the content item as measured by a social networking system.

6. The computer-implemented method of claim 1, wherein the offset segments of the second stream are generated based at least in part on a probability transition map that predicts a direction of the viewport interface while accessing the content item for any given playback position.

7. The computer-implemented method of claim 1, wherein the offset segments of the second stream are generated based at least in part on subject matter captured in the scene.

8. The computer-implemented method of claim 1, wherein the amount of offset of the second stream is determined based on subject matter captured in the scene.

9. The computer-implemented method of claim 1, wherein the set of streams collectively capture a 360-degree view of the scene.

10. The computer-implemented method of claim 1, wherein the second stream being presented through the viewport interface is selected based at least in part on a direction of the viewport interface relative to the scene.

11. A system comprising:
    at least one processor; and
    a memory storing instructions that, when executed by the at least one processor, cause the system to perform:
       receiving a plurality of streams of an immersive video of a scene, wherein each stream corresponds to a viewable direction in the immersive video;

partitioning each stream into a set of base segments;
presenting a set of base segments of a first stream corresponding to a first direction in a viewport interface; and
upon detecting a change from the first direction of the viewport interface to a second direction during playback of the first stream,
   stopping presentation of the set of base segments of the first stream, and
   starting presentation of offset segments of a second stream corresponding to the second direction in the viewport interface to reduce latency,
      wherein the offset segments are offset from base segments of the second stream;
      wherein the amount of offset of the second stream is determined based at least in part on a probability transition map predicting changes from the first direction in the viewport interface to the second direction during playback of the first stream.

12. The system of claim 11, wherein the base segments of the first stream each correspond to a pre-determined fixed-length duration of the first stream.

13. The system of claim 12, wherein the offset segments of the second stream each correspond to a pre-determined fixed-length duration of the second stream, each offset segment being offset from the respective playback positions of the base segments of the first stream by a pre-determined amount.

14. The system of claim 11, wherein the offset segments of the second stream are generated based at least in part on a publisher of the content item.

15. The system of claim 11, wherein the offset segments of the second stream are generated based at least in part on a popularity of the content item as measured by a social networking system.

16. A non-transitory computer-readable storage medium including instructions that, when executed by at least one processor of a computing system, cause the computing system to perform a method comprising:
receiving a plurality of streams of an immersive video of a scene, wherein each stream corresponds to a viewable direction in the immersive video;
partitioning each stream into a set of base segments;
presenting a set of base segments of a first stream corresponding to a first direction in a viewport interface; and
upon detecting a change from the first direction of the viewport interface to a second direction during playback of the first stream,
   stopping presentation of the set of base segments of the first stream, and
   starting presentation of offset segments of a second stream corresponding to the second direction in the viewport interface to reduce latency,
      wherein the offset segments are offset from base segments of the second stream;
      wherein the amount of offset of the second stream is determined based at least in part on a probability transition map predicting changes from the first direction in the viewport interface to the second direction during playback of the first stream.

17. The non-transitory computer-readable storage medium of claim 16, wherein the base segments of the first stream each correspond to a pre-determined fixed-length duration of the first stream.

18. The non-transitory computer-readable storage medium of claim 17, wherein the offset segments of the second stream each correspond to a pre-determined fixed-length duration of the second stream, each offset segment being offset from the respective playback positions of the base segments of the first stream by a pre-determined amount.

19. The non-transitory computer-readable storage medium of claim 16, wherein the offset segments of the second stream are generated based at least in part on a publisher of the content item.

20. The non-transitory computer-readable storage medium of claim 16, wherein the offset segments of the second stream are generated based at least in part on a popularity of the content item as measured by a social networking system.

* * * * *